US011855530B1

(12) United States Patent
Feng et al.

(10) Patent No.: US 11,855,530 B1
(45) Date of Patent: Dec. 26, 2023

(54) RESONANT CONVERTER WITH MULTIPLE RESONANT TANK CIRCUITS

(71) Applicant: Monolithic Power Systems, Inc., San Jose, CA (US)

(72) Inventors: Junjie Feng, Campbell, CA (US); Xu Han, Hangzhou (CN); Fengchun He, Hangzhou (CN); Daocheng Huang, Cupertino, CA (US); Yuhang Sun, Hangzhou (CN)

(73) Assignee: MONOLITHIC POWER SYSTEMS, INC., San Jose, CA (US)

( * ) Notice: Subject to any disclaimer, the term of this patent is extended or adjusted under 35 U.S.C. 154(b) by 7 days.

(21) Appl. No.: 17/881,937

(22) Filed: Aug. 5, 2022

(51) Int. Cl.
*H02M 3/00* (2006.01)
*H02M 3/335* (2006.01)
*H02M 1/12* (2006.01)

(52) U.S. Cl.
CPC .............. *H02M 3/01* (2021.05); *H02M 1/12* (2013.01); *H02M 3/33573* (2021.05); *H02M 3/33576* (2013.01); *H02M 3/33592* (2013.01)

(58) Field of Classification Search
CPC ...... H02M 3/01; H02M 1/12; H02M 3/33573; H02M 3/33576; H02M 3/33592
See application file for complete search history.

(56) References Cited

U.S. PATENT DOCUMENTS

| 6,057,652 | A * | 5/2000 | Chen | H05B 41/28 315/307 |
|---|---|---|---|---|
| 9,787,195 | B1 * | 10/2017 | Xiong | H02M 3/33507 |
| 9,831,787 | B1 * | 11/2017 | Halberstadt | H02M 3/33546 |
| 10,003,267 | B1 * | 6/2018 | Zhao | H02M 3/33573 |
| 10,992,233 | B2 * | 4/2021 | Dincan | H02M 3/01 |
| 2005/0099827 | A1 * | 5/2005 | Sase | H02M 3/3376 363/16 |
| 2013/0077356 | A1 * | 3/2013 | Cohen | H02M 3/33507 363/21.02 |
| 2014/0254203 | A1 * | 9/2014 | Dai | H02M 3/01 363/17 |

(Continued)

OTHER PUBLICATIONS

ON Semiconductor, "Basic Principles of LLC Resonant Half Bridge Converter and DC/Dynamic Circuit Simulation Examples", https://www.onsemi.com/pub/Collateral/AND9408-D.PDF, pp. 1-10, Apr. 2016.

(Continued)

*Primary Examiner* — Yusef A Ahmed
(74) *Attorney, Agent, or Firm* — Beyer Law Group LLP (57) ABSTRACT

A resonant converter has a primary resonant tank circuit and a secondary resonant tank circuit. An inverter circuit converts an input DC voltage received by the resonant converter at an input voltage node to a pulsating signal that is fed to the primary resonant tank circuit to generate a resonant tank current that flows through a primary winding of a transformer. The resonant tank current induces current in a secondary winding of the transformer. The induced current is rectified by a rectifier and the rectified signal is filtered by an output capacitor to generate an output DC voltage at an output voltage node. The secondary resonant tank circuit is disposed between the input voltage node and the output voltage node to inject odd order harmonics of the operating frequency to the primary tank circuit to shape the resonant tank current.

9 Claims, 6 Drawing Sheets

(56) References Cited

U.S. PATENT DOCUMENTS

| | | | | |
|---|---|---|---|---|
| 2016/0181927 A1* | 6/2016 | Chang | ............... | H02M 1/42 |
| | | | | 363/21.02 |
| 2016/0285387 A1* | 9/2016 | Rodriguez | ............... | H02M 1/12 |
| 2017/0104417 A1* | 4/2017 | Hung | ............... | H02M 3/3376 |
| 2019/0296650 A1* | 9/2019 | Wang | ............... | H02M 3/33573 |
| 2019/0319532 A1* | 10/2019 | Wang | ............... | H02M 3/33573 |
| 2020/0177089 A1* | 6/2020 | Abdel-Rahman | ............... | H02M 1/36 |
| 2021/0091673 A1* | 3/2021 | Xie | ............... | H02M 1/08 |
| 2021/0159803 A1* | 5/2021 | Waghmare | ............... | H01F 27/2804 |
| 2022/0014099 A1* | 1/2022 | Kim | ............... | H02M 1/083 |

OTHER PUBLICATIONS

D. Huang, X. Wu and F. C. Lee, "Novel non-isolated LLC resonant converters," 2012 Twenty-Seventh Annual IEEE Applied Power Electronics Conference and Exposition (APEC), Orlando, FL, USA, 2012, pp. 1373-1380.

Yu, Sheng-Yang, "Survey of Resonant Converter Topologies", Power Supply Design Seminar, Texas Instruments Incorporated, 2018.

* cited by examiner

RESONANT CONVERTER WITH MULTIPLE RESONANT TANK CIRCUITS

TECHNICAL FIELD

The present invention is directed to electrical circuits and more particularly to resonant converters.

BACKGROUND

As its name indicates, a converter is an electrical circuit that converts an input voltage to a regulated output voltage. A resonant converter is a type of converter that converts a DC input voltage to a regulated DC output voltage using a resonant tank circuit. A conventional resonant converter includes a DC to AC (DC/AC) inverter that converts the DC input voltage to a square wave. The resonant tank circuit filters the harmonics of the square wave, resulting in a sinusoidal current that is provided to an AC to DC (AC/DC) rectifier by way of a transformer. The rectified output of the rectifier is filtered by an output capacitor to generate the DC output voltage. The impedance of the resonant tank circuit is zero at its resonant frequency and becomes larger at frequencies away from the resonant frequency. Accordingly, the power delivered by the resonant converter to a load may be varied by changing the operating frequency of the resonant converter.

Embodiments of the present invention pertain to a novel resonant converter topology with primary and secondary resonant tank circuits.

BRIEF SUMMARY

In one embodiment, a resonant converter receives a DC input voltage at an input voltage node and generates a DC output voltage at an output voltage node. The resonant converter comprises an inverter circuit, a primary resonant tank circuit, a rectifier, and a secondary resonant tank circuit. The inverter circuit converts the DC input voltage to a pulsating signal, such as a square wave. The primary resonant tank circuit comprises a first resonant capacitor, a first resonant inductor, and a primary winding of a transformer that are connected in series, wherein the primary resonant tank circuit receives the pulsating signal to generate a resonant tank current that flows through the primary winding of the transformer. The resonant tank current induces a current in a secondary winding of the transformer, which is rectified by the rectifier. An output capacitor filters the rectified signal to the DC output voltage.

The secondary resonant tank circuit is disposed between the input voltage node and the output voltage node. The secondary resonant tank circuit comprises a second resonant capacitor and a second resonant inductor, wherein the secondary tank circuit has a resonant frequency that is higher than a resonant frequency of the primary resonant tank circuit. The secondary resonant tank circuit injects an odd order harmonic of the operating frequency of the resonant converter to the primary resonant tank circuit to shape the resonant tank current of the primary resonant tank circuit.

In another embodiment, a method of operation of a resonant converter includes receiving a DC input voltage at an input voltage node of the resonant converter. An inverter circuit converts the DC input voltage to a pulsating signal. The pulsating signal is fed to a primary resonant tank circuit to generate a resonant tank current that flows through a primary winding of a transformer, the primary resonant tank circuit comprising the primary winding of the transformer, a first resonant inductor, and a first resonant capacitor. A rectifier rectifies an induced current that flows through a secondary winding of the transformer, the induced current being induced by the resonant tank current. A capacitor filters a rectified output of the rectifier to generate a DC output voltage of the resonant converter. A secondary resonant tank circuit injects an odd order harmonic of an operating frequency of the resonant converter to the primary resonant tank circuit, wherein the secondary tank circuit has a resonant frequency that is higher than that of the primary tank circuit.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
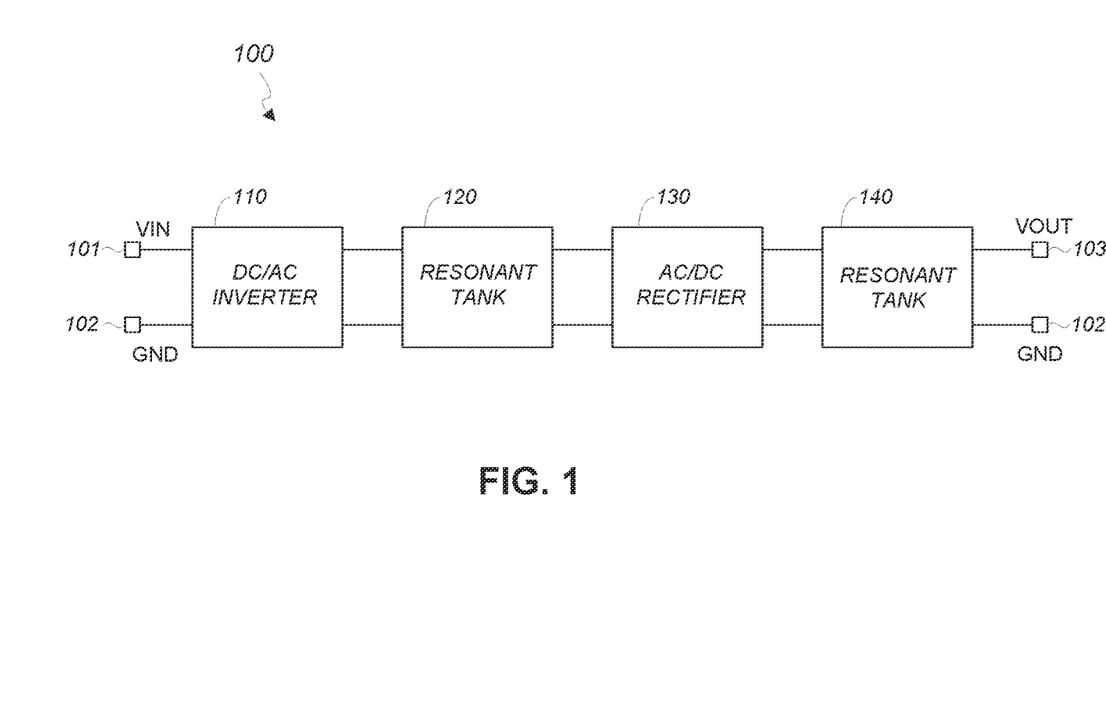
FIG. 1 is a logical diagram of a resonant converter in accordance with an embodiment of the present invention.

FIG. 1 is a logical diagram of a resonant converter 100 in accordance with an embodiment of the present invention. In the example of FIG. 1, the resonant converter 100 comprises a switch network in the form of a DC/AC inverter circuit 110, a resonant tank circuit 120, an AC/DC rectifier 130, and a resonant tank circuit 140. The inverter circuit 110 receives a DC input voltage VIN across an input voltage node 101 and a ground node 102. The inverter circuit 110 converts the input voltage VIN to a pulsating voltage, such as a square wave, which is received by the resonant tank circuit 120.

The resonant tank circuit 120 filters the pulsating voltage from the inverter circuit 110, resulting in a sinusoidal resonant tank current that flows through the resonant tank circuit 120. In one embodiment, the resonant tank circuit 120 includes a magnetizing inductance of a primary winding of a transformer (not shown in FIG. 1). That is, the resonant tank current flows through the primary winding of the transformer. The rectifier 130 rectifies the induced current on the secondary winding of the transformer. An output capacitor (not shown in FIG. 1) filters the rectified output signal of the rectifier 130 to generate a DC output voltage across an output voltage node 103 and the ground node 102.

The impedance of the resonant tank circuit 120 may be varied by changing the operating frequency of the resonant converter 100, which in this example is the frequency of the square wave output of the inverter circuit 110. The impedance of the resonant tank circuit 120 is zero at an operating frequency equal to the resonant frequency of the resonant tank circuit 120 and becomes larger as the operating frequency deviates from the resonant frequency. The output volage on the output voltage node 103 may thus be controlled by controlling the operating frequency of the resonant converter 100.

The resonant tank circuit 120 is also referred to herein as a "primary resonant tank" because it is the resonant tank circuit that generates the resonant tank current that flows through the primary winding of the transformer. The resonant tank circuit 140, and resonant tank circuits other than the resonant tank circuit 120, is also referred to herein as a "secondary resonant tank." A secondary resonant tank generates odd order harmonics of the operating frequency that get injected to the primary resonant tank, thereby shaping the resonant tank current waveform to more approximate a square wave. Advantageously, doing so lowers the RMS value of the resonant tank current and reduces conduction loss for better energy efficiency.

The resonant frequency of the resonant tank circuit 140 is different from the resonant frequency of the of the resonant tank circuit 120. In one embodiment, the resonant frequency of the resonant tank circuit 140 is higher than and is an odd order harmonic of the resonant frequency of the resonant tank circuit 120. The resonant tank circuit 140 is configured to generate odd order harmonics of the operating frequency of the resonant converter 100, which as noted are injected to the resonant tank circuit 120 to shape the waveform of the resonant tank current of the resonant tank circuit 120.

Figure 2:
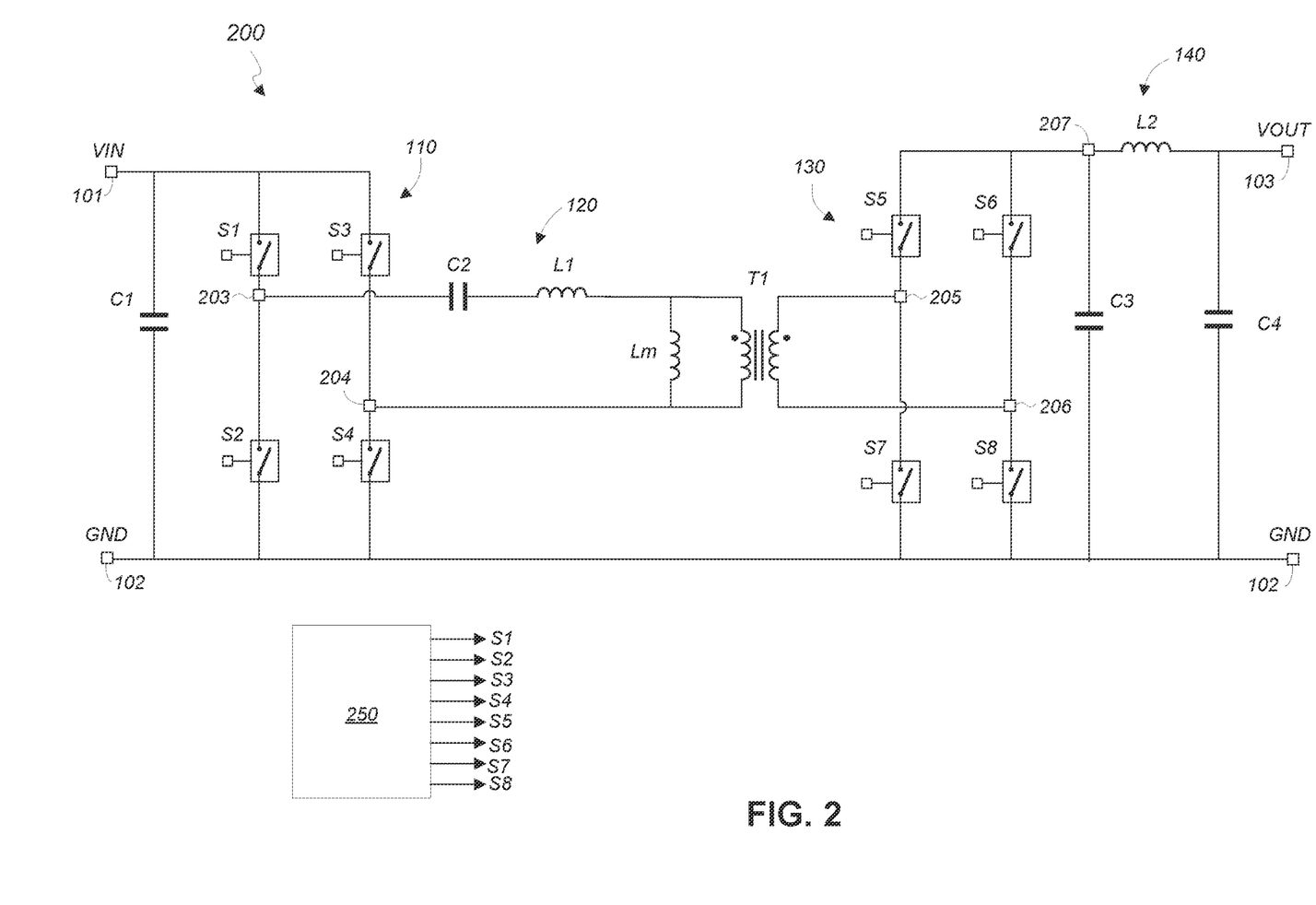
FIG. 2 is a schematic diagram of a particular implementation of the resonant converter of FIG. 1 in accordance with an embodiment of the present invention.

FIG. 2 is a schematic diagram of a resonant converter 200 in accordance with an embodiment of the present invention. The resonant converter 200 is a particular implementation of the resonant converter 100 of FIG. 1. The resonant converter 200 comprises the inverter circuit 110, the resonant tank circuit 120, the rectifier 130, and the resonant tank circuit 140. The resonant converter 200 receives the DC input voltage VIN at the input voltage node 101 and provides the DC output voltage VOUT at the output voltage node 103. A capacitor C1 across the input voltage node 101 and the ground node 102 serves as an input capacitor, and a capacitor C4 across the output voltage node 103 and the ground node 102 serves as an output capacitor.

The resonant converter 200 includes a plurality of switches S1-S8. Each of the switches S1-S8 may comprise a metal-oxide-semiconductor field-effect transistor (MOSFET) or other type of transistor. Each of the switches S1-S8 may have a first terminal (e.g., drain), a second terminal (e.g., source), and a control terminal (e.g., gate). The connection between the first and second terminals of a switch may be controlled by a signal at the control terminal of the switch.

In the example of FIG. 2, the inverter circuit 110 comprises the switches S1-S4. The first terminals of the switches S1 and S3 are connected to the input voltage VIN at the input voltage node 101. A second terminal of the switch S1 is connected to a first terminal of the switch S2 at a first bridge node 203, and a second terminal of the switch S3 is connected to a first terminal of the switch S4 at a second bridge node 204. The second terminals of the switches S2 and S4 are directly connected to the ground node 102 in this embodiment.

A controller 250 provides control signals at the control terminals of the switches S1-S8. The controller 250 drives the switches S1-S4 at the operating frequency of the resonant converter 200 to generate the square wave that is input to the resonant tank circuit 120. Accordingly, the square wave has the same frequency as the operating frequency of the resonant converter 200. Similarly, the controller 250 drives the switches S5-S8 to rectify the induced current flowing through a secondary winding of a transformer T1. Generally, the controller 250 may drive the switches S1-S8 to generate the regulated DC output voltage VOUT in accordance with a conventional control algorithm without detracting from the merits of the present invention.

In the example of FIG. 2, the resonant tank circuit 120 comprises a resonant capacitor C2, a resonant inductor L1, and a magnetizing inductance Lm of a primary winding of the transformer T1. The resonant frequency of the resonant tank circuit 120 is different from the resonant frequency of the resonant tank circuit 140. The resonant frequency of the resonant tank circuit 140 is higher than that of the resonant tank circuit 120.

The resonant capacitor C2, the resonant inductor L1, and the magnetizing inductance Lm are connected in series. The first bridge node 203 serves as a first end node of the resonant tank circuit 120, and the second bridge node 204 serves as a second end node of the resonant tank circuit 120. A first end of the resonant capacitor C2 is connected to the first bridge node 203; a second end of the resonant capacitor C2 is connected to a first end of the resonant inductor L1; a second end of the resonant inductor L1 is connected to a first end of the primary winding of the transformer T1; and a second end of the primary winding of the transformer T1 is connected to the second bridge node 204. The secondary winding of the transformer T1 has a first end that is connected to a third bridge node 205 and a second end that is connected to a fourth bridge node 206.

In the example of FIG. 2, the rectifier 130 comprises the switches S5-S8. The first terminals of the switches S5 and S6 are connected to a secondary tank node 207. A second terminal of the switch S5 is connected to a first terminal of the switch S7 at the third bridge node 205, and a second terminal of the switch S6 is connected to a first terminal of the switch S8 at the fourth bridge node 206. The second terminals of the switches S7 and S8 are connected to the ground node 102. The controller 250 provides control signals to the control terminals of the switches S5-S8 to rectify the current induced in the secondary winding of the transformer T1. The controller 250 may drive the switches S5-S8 at the same (or approximately the same) frequency as the operating frequency of the resonant converter 200.

As can be appreciated, the resonant tank circuit 140 may be implemented using a variety of resonant tank topologies, including as a series resonant tank, a parallel resonant tank, a parallel-series resonant tank, etc. In the example of FIG. 2, the resonant tank circuit 140 comprises a resonant capacitor C3 and a resonant inductor L2. The resonant capacitor C3 has a first end that is connected to the secondary tank node 207 and a second end that is connected to the ground node 102. The resonant inductor L2 has a first end that is connected to the first end of the capacitor C3 at the secondary tank node 207 and a second end that is connected to the output voltage node 103.

The resonant tank circuit 140 is configured to generate odd (e.g., third, fifth, seventh) order harmonics of the operating frequency of the resonant converter 200. The odd order harmonics generated by the resonant tank circuit 140 flow back to the resonant tank circuit 120 by way of the rectifier 130 and the transformer T1.

The resonant frequency of the resonant tank circuit 140 is higher than and is an odd order harmonic of the resonant frequency of the resonant tank circuit 120. In one embodiment, the resonant tank circuit 140 has a resonant frequency of 2.1 MHz, whereas the resonant tank circuit 120 has a resonant frequency of 700 kHz. As can be appreciated, the resonant frequencies of the resonant tank circuits 120 and 140 depend on the particulars of the application.

In operation, the controller 250 controls the switches S1-S4 to convert the input voltage VIN to a square wave that is received by the resonant tank circuit 120. The resonant tank circuit 120 filters the square wave, resulting in a sinusoidal resonant tank current that flows through the resonant capacitor C2, the resonant inductor L1, and the primary winding of the transformer T1. The resonant tank current induces current in the secondary winding of the transformer T1, which is rectified by the switching of the switches S5-S8 to generate a rectified current that is filtered by the capacitor C4. The resonant tank circuit 140 is configured to generate odd order harmonics of the operating frequency, which flow back to the resonant tank circuit 120 through the rectifier 130 and the transformer T1.

Figure 3:
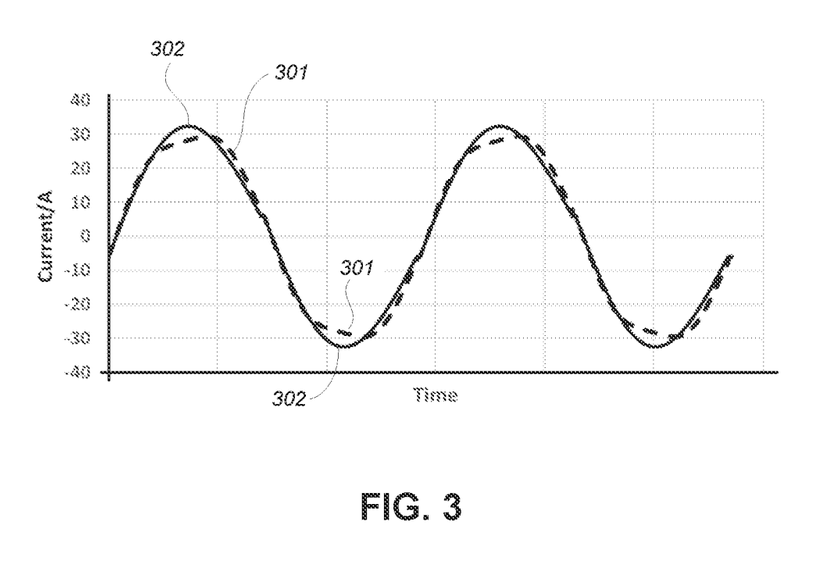
FIG. 3 shows simulated waveforms that compare the resonant tank current of the resonant converter of FIG. 2 to that of a conventional resonant converter.

FIG. 3 shows simulated waveforms that compare the resonant tank current of the resonant converter 200 to that of a conventional resonant converter. In the example of FIG. 3, the vertical axis is current in amps and the horizontal axis is time in microseconds.

In the example of FIG. 3, the current waveform 301 (FIG. 3, dashed plot) is for the resonant tank current flowing through the resonant capacitor C2, resonant inductor L1, and the primary winding of the transistor T1 of the resonant tank circuit 120. The current waveform 302 (FIG. 3, solid plot) is for a resonant tank current of a conventional resonant converter, i.e., without a secondary resonant tank. The odd order harmonics from the resonant tank circuit 140 shape the waveform 301 to more approximate a square wave, thereby lowering RMS value and conduction loss relative to a conventional resonant converter.

In the resonant converter 200 of FIG. 2, odd order harmonics from the resonant tank circuit 140 are injected to the resonant tank circuit 120 by being in-line following the output of the resonant tank circuit 120. More particularly, odd order harmonics generated by the resonant tank circuit 140 go through the rectifier 130 and the transformer T1. The effect of odd order harmonic injection may be enhanced by coupling the resonant tank circuit 140 to the input of the resonant tank circuit 120 as now described with reference to FIG. 4.

Figure 4:
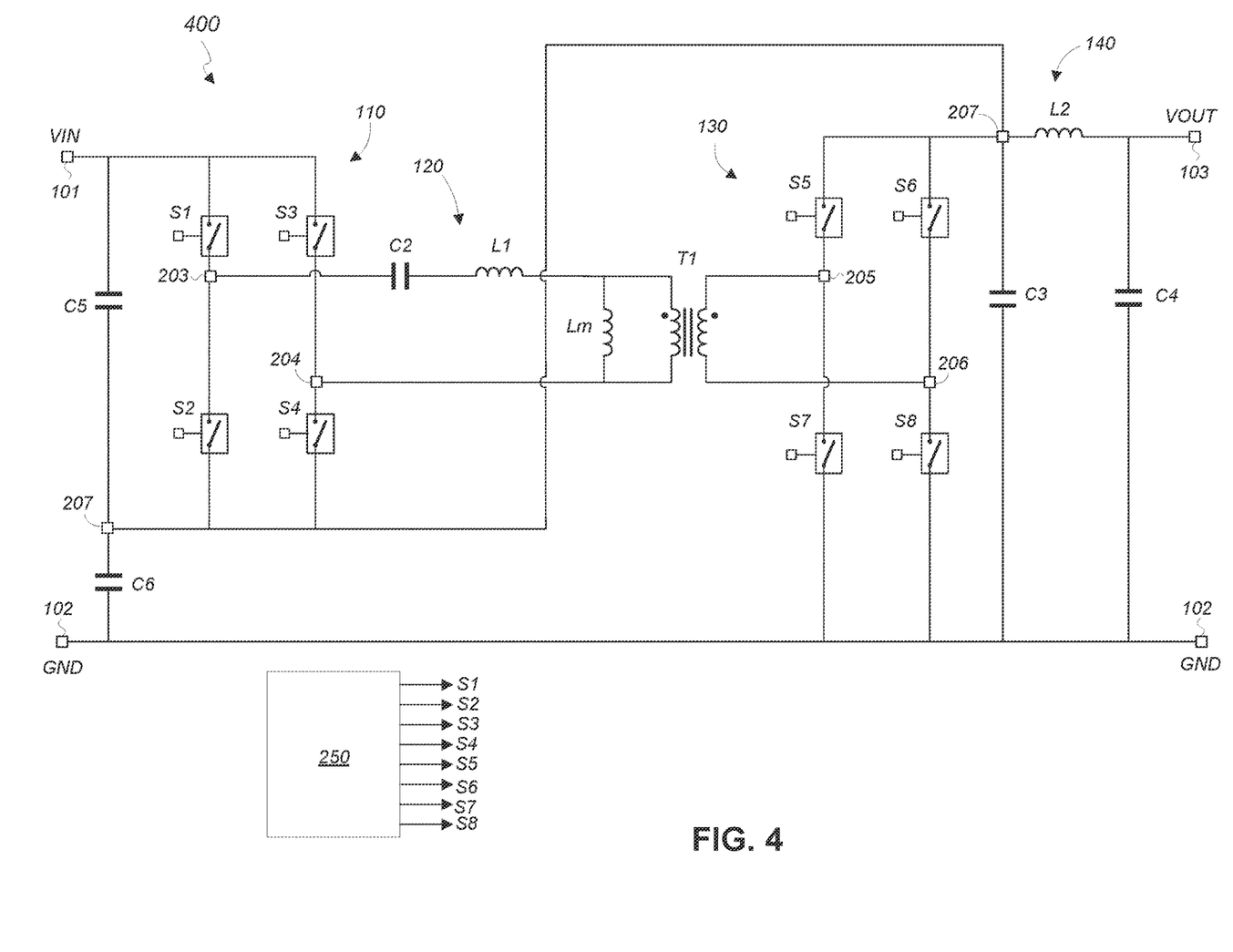
FIG. 4 is a schematic diagram of another particular implementation of the resonant converter of FIG. 1 in accordance with an embodiment of the present invention.

FIG. 4 is a schematic diagram of a resonant converter 400 in accordance with an embodiment of the present invention. The resonant converter 400 is a particular implementation of the resonant converter 100 of FIG. 1. The resonant converter 400 comprises the inverter circuit 110, the resonant tank circuit 120, the rectifier 130, the resonant tank circuit 140, the transformer T1, and the controller 250, which were previously explained with reference to the resonant converter 200 of FIG. 2. In the resonant converter 400, these components are connected and function in essentially the same manner except for modifications that allow the secondary tank node 207 to be connected to the input of resonant tank circuit 120 as further explained below.

As before, the resonant converter 400 receives the DC input voltage VIN across the input voltage node 101 and the ground node 102 and provides the DC output voltage VOUT across the output voltage node 103 and the ground node 102. However, instead of having the input capacitor C1 across the input voltage node 101 and the ground node 102 as in the resonant converter 200 of FIG. 2, a capacitor C5 is across the input voltage node 101 and the secondary tank node 207, and a capacitor C6 is across the secondary tank node 207 and the ground node 102.

As before, the inverter circuit 110 comprises the switches S1-S4. The first terminals of the switches S1 and S3 are connected to the input voltage VIN at the input voltage node 101. A second terminal of the switch S1 is connected to a first terminal of the switch S2 at the first bridge node 203, and a second terminal of the switch S3 is connected to a first terminal of the switch S4 at the second bridge node 204. However, instead of being directly connected to the ground node 102 as in the resonant converter 200 of FIG. 2, the second terminals of the switches S2 and S4 are connected to the secondary tank node 207. Connecting the secondary tank node 207 to the input of the resonant tank circuit 120, by way of the switches S2 and S4, enhances the injection of odd order harmonics to the resonant tank circuit 120. The inverter circuit 110, the resonant tank circuit 120, the rectifier 130, the resonant tank circuit 140, the transformer T1, and the controller 250 are otherwise connected and function as previously explained with reference to the resonant converter 200 of FIG. 2.

Figure 5:
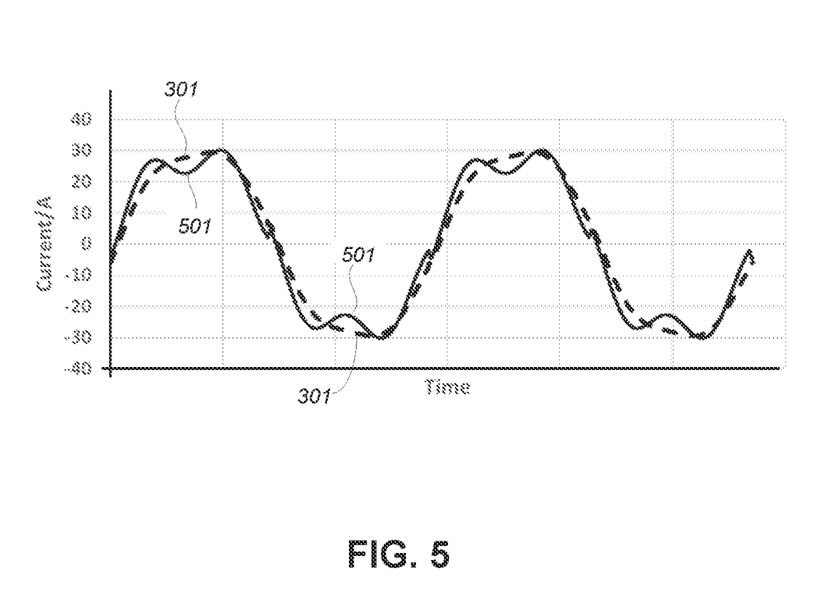
FIG. 5 shows simulated waveforms that compare the resonant tank current of the resonant converter of FIG. 4 to that of the resonant converter of FIG. 2.

FIG. 5 shows simulated waveforms that compare the resonant tank current of the resonant converter 400 of FIG. 4 to that of the resonant converter 200 of FIG. 2. In the example of FIG. 5, the vertical axis is current in amps and the horizontal axis is time in microseconds.

In the example of FIG. 5, the waveform 501 (FIG. 5, solid plot) is for the resonant tank current flowing through the resonant tank circuit 120 in the resonant converter 400, whereas the waveform 301 (FIG. 5, dashed plot) is for the resonant tank current flowing through the resonant tank circuit 120 in the resonant converter 200. In both the resonant converters 200 and 400, odd order harmonics generated by the resonant tank circuit 140 shape the resonant tank current to approximate a square wave. However, in the case of the resonant converter 400, the enhanced odd order harmonic injection results in even better approximation of a square wave. This results in further lowering of RMS value and further reduction of conduction loss.

Figure 6:
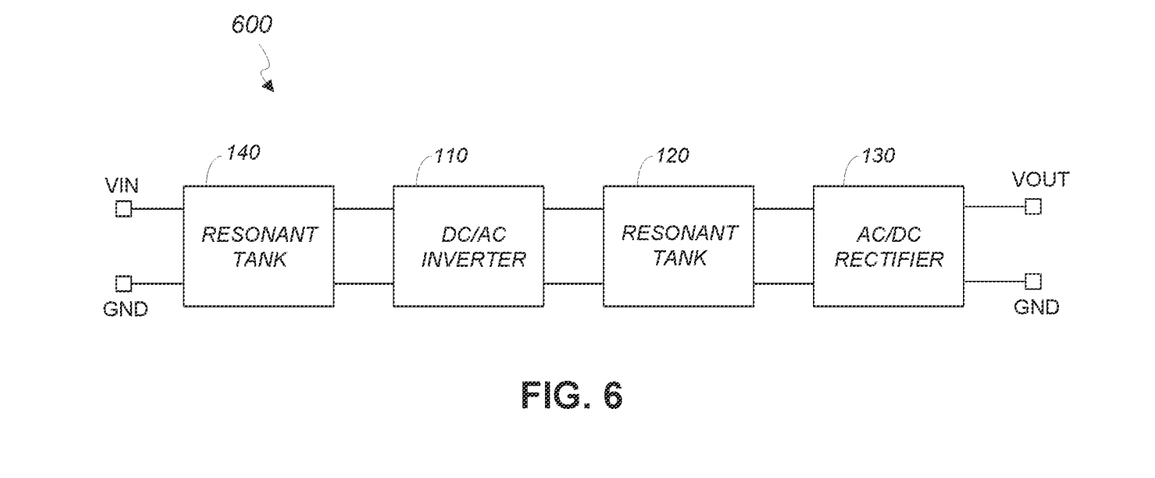
FIG. 6 is a logical diagram of a resonant converter where a secondary resonant tank circuit is disposed before the inverter circuit in accordance with an embodiment of the present invention.

In the above embodiments, the secondary resonant tank circuit is disposed as a circuit stage after the primary resonant tank circuit. In general, a secondary tank circuit may be disposed as a circuit stage between an input voltage node and an output voltage node. More particularly, the secondary resonant tank circuit may also be disposed before the primary resonant tank circuit or both before and after the primary resonant tank circuit. For example, a resonant converter 600 of FIG. 6 and the resonant converter 200 of FIG. 2 are the same except that the resonant tank circuit 140 is disposed before the inverter circuit 110 in the resonant converter 600.

Figure 7:
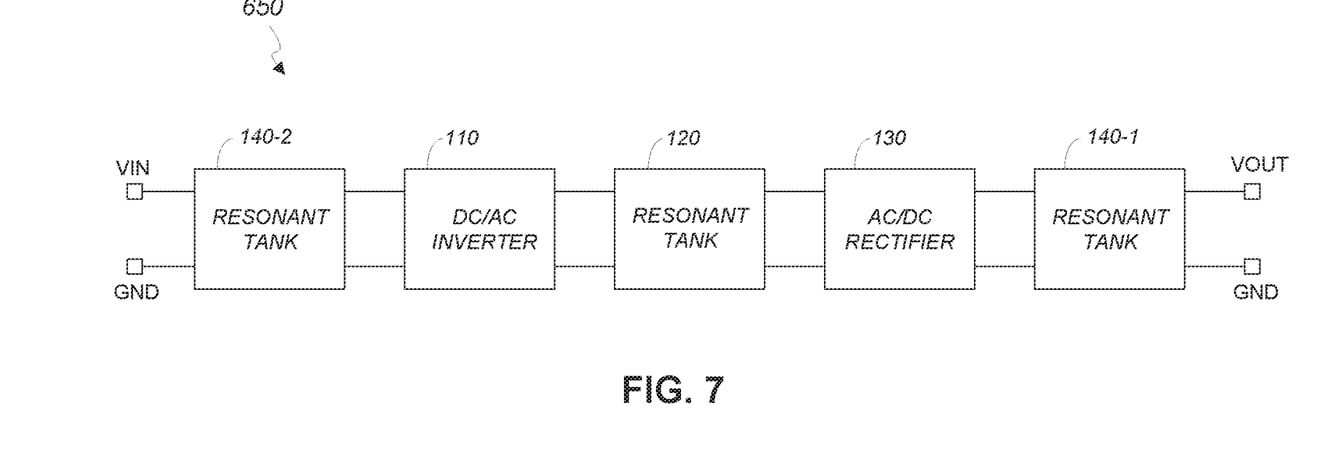
FIG. 7 is a logical diagram of a resonant converter where a secondary resonant tank circuit is disposed at both ends of the resonant converter in accordance with an embodiment of the present invention.

As another example, a resonant converter 650 of FIG. 7 is the same as the resonant converter 200 of FIG. 2 except that the resonant converter 650 has two secondary resonant tank circuits. In the resonant converter 650, each of the resonant tank circuits 140-1 and 140-2 has the same topology as the resonant tank circuit 140 of FIG. 2. The resonant frequency of each of the resonant tank circuits 140-1 and 140-2 is higher than and is an order harmonic of the resonant frequency of the resonant tank circuit 120. The resonant frequencies of the resonant tank circuits 140-1 and 140-2 can be the same or different. For example, the resonant tank circuit 120 may have a resonant frequency of 700 kHz, the resonant tank circuit 140-1 may have a resonant frequency of 2.1 Mhz, and the resonant tank circuit 140-2 may have a resonant frequency of 3.5 Mhz.

The particulars of deploying a secondary resonant tank circuit between the input voltage node and the output voltage node depend on the particulars of the resonant converter. In general, an input node of a secondary tank circuit may be connected to an output node of a previous circuit stage and an output node of the secondary tank circuit may be connected to an input node of the next circuit stage.

Figure 8:
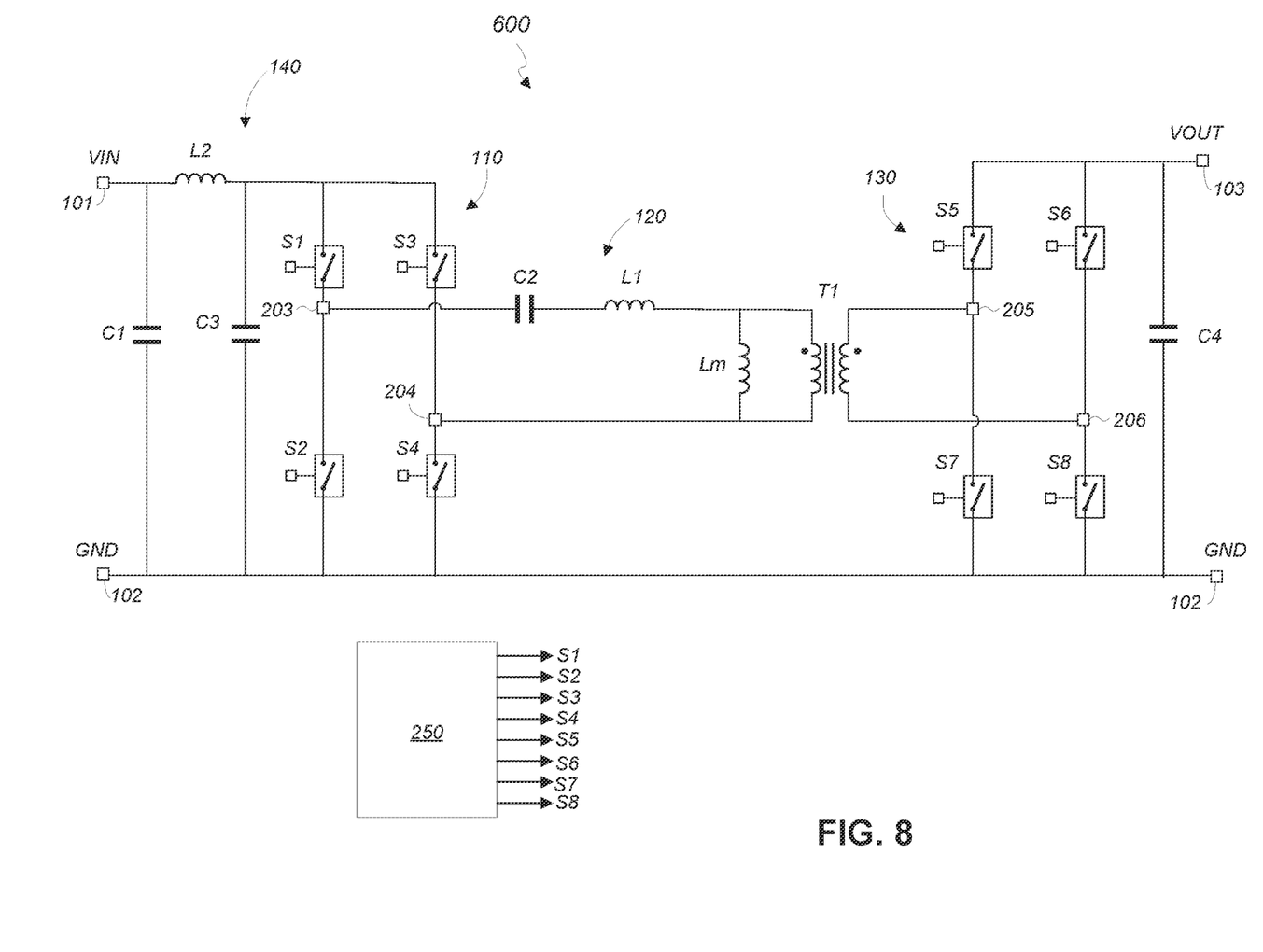
FIG. 8 is a schematic diagram of a particular implementation of the resonant converter of FIG. 6 in accordance with an embodiment of the present invention.

For example, FIG. 8 is a schematic diagram of the resonant converter 600 (also shown in FIG. 6), where the resonant tank circuit 140, comprising the resonant inductor L2 and the resonant capacitor C3, is disposed before the inverter circuit 110. In the example of FIG. 8, the placement of the resonant inductor L2 relative to the resonant capacitor C3 have been changed to prevent the capacitors C3 and C1 from being clamped by the source of the input voltage. As can be appreciated, a resonant tank circuit 140 may also be disposed, with suitable modifications, in another location between the input voltage node 101 and the output voltage node 103.

Resonant converters with primary and secondary resonant tank circuits have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A resonant converter that receives a DC input voltage at an input voltage node and generates a DC output voltage at an output voltage node, the resonant converter comprising:
   an inverter circuit that converts the DC input voltage to a pulsating signal;
   a primary resonant tank circuit comprising a first resonant capacitor, a first resonant inductor, and a primary winding of a transformer that are connected in series, wherein the primary resonant tank circuit is connected to the inverter to receive the pulsating signal to generate a resonant tank current that flows through the primary winding of the transformer;
   a rectifier that is connected to a secondary winding of the transformer to rectify a current induced in the secondary winding of the transformer by the resonant tank current;
   an output capacitor that is connected to the output voltage node; and
   a secondary resonant tank circuit that is disposed between the input voltage node and the output voltage node, the secondary resonant tank circuit comprising a second resonant capacitor and a second resonant inductor, wherein the secondary tank circuit has a resonant frequency that is higher than a resonant frequency of the primary resonant tank circuit;
   wherein the secondary resonant tank circuit has a tank node that is connected to an input of the primary tank resonant circuit, and the tank node is connected between terminals of the second resonant capacitor and the second resonant inductor of the secondary resonant tank circuit;
   wherein the inverter circuit comprises a first switch, a second switch, a third switch, and a fourth switch; first terminals of the first and third switches are connected to the input voltage node; a second terminal of the first switch and a first terminal of the second switch are connected to a first end node of the primary resonant tank circuit; a second terminal of the third switch and a first terminal of the fourth switch are connected to a second end node of the primary resonant tank circuit; and the tank node is connected to second terminals of the second and fourth switches; and
   wherein the resonant converter further comprising a capacitor having a first end that is directly connected to the second terminals of the second and fourth switches and a second end that is directly connected to ground.

2. The resonant converter of claim 1, wherein the secondary resonant tank circuit is connected to an output of the rectifier.

3. The resonant converter of claim 2, wherein the rectifier comprises a fifth switch, a sixth switch, a seventh switch, and an eight switch; first terminals of the fifth and sixth switches are connected to the tank node of the secondary resonant tank circuit; a second terminal of the fifth switch and a first terminal of the seventh switch are connected to a first end of the secondary winding of the transformer; a second terminal of the sixth switch and a first terminal of the eight switch are connected to a second end of the secondary winding of the transformer; and second terminals of the seventh and eight switches are connected to the ground.

4. A resonant converter comprising:
   an inverter circuit comprising a first switch having a first terminal that is connected to an input voltage node of the resonant converter and a second terminal that is connected to a first terminal of a second switch, a third switch having a first terminal that is connected to the input voltage node of the resonant converter and a second terminal that is connected to a first terminal of a fourth switch, the second switch having a second terminal that is connected to a second terminal of the fourth switch;
   a primary resonant tank circuit having a first end node that is connected to the second terminal of the first switch and the first terminal of the second switch and a second end node that is connected to the second terminal of the third switch and the first terminal of the fourth switch, the primary resonant tank circuit comprising a first resonant capacitor, a first resonant inductor, and a primary winding of a transformer;
   a capacitor having a first end that is directly connected to the second terminals of the second and fourth switches and a second end that is directly connected to ground;
   a rectifier that is connected to a secondary winding of the transformer; and
   a secondary resonant tank circuit that is connected between the input voltage node of the resonant converter and an output voltage node of the resonant converter, the secondary resonant tank circuit comprising a second resonant capacitor and a second resonant inductor, and wherein the secondary resonant tank circuit having a resonant frequency that is higher than that of the primary resonant tank circuit;

wherein the secondary tank circuit has a tank node that is connected to the second end node of the primary resonant tank circuit by way of the second terminals of the second and fourth switches, and the tank node is connected between terminals of the second resonant capacitor and the second resonant inductor of the secondary resonant tank circuit.

5. The resonant converter of claim 4, wherein the rectifier is disposed as a circuit stage between the primary resonant tank circuit and the secondary resonant tank circuit.

6. The resonant converter of claim 4, wherein the inverter circuit is disposed as a circuit stage between the secondary resonant tank circuit and the primary resonant tank circuit.

7. A method of operation of a resonant converter, the method comprising:

receiving a DC input voltage at an input voltage node of the resonant converter;

converting, by an inverter circuit, the DC input voltage to a pulsating signal;

receiving the pulsating signal in a primary resonant tank circuit to generate a resonant tank current that flows through a primary winding of a transformer, the primary resonant tank circuit comprising the primary winding of the transformer, a first resonant inductor, and a first resonant capacitor;

rectifying, by a rectifier, an induced current that flows through a secondary winding of the transformer, the induced current being induced by the resonant tank current;

filtering a rectified output of the rectifier to generate a DC output voltage of the resonant converter; and injecting, by a secondary resonant tank circuit, an odd order harmonic of an operating frequency of the resonant converter to the primary resonant tank circuit, wherein the secondary tank circuit has a resonant frequency that is higher than that of the primary tank circuit;

wherein the secondary tank circuit comprises a second resonant inductor and a second resonant capacitor;

wherein the secondary resonant tank circuit has a tank node that is connected to an input of the primary tank resonant circuit, and the tank node is connected between terminals of the second resonant capacitor and the second resonant inductor of the secondary resonant tank circuit;

wherein the inverter circuit comprises a first switch, a second switch, a third switch, and a fourth switch; first terminals of the first and third switches are connected to the input voltage node; a second terminal of the first switch and a first terminal of the second switch are connected to a first end node of the primary resonant tank circuit; a second terminal of the third switch and a first terminal of the fourth switch are connected to a second end node of the primary resonant tank circuit; and the tank node is connected to second terminals of the second and fourth switches; and wherein the resonant converter comprises a capacitor having a first end that is directly connected to the second terminals of the second and fourth switches and a second end that is directly connected to ground.

8. The method of claim 7, wherein the secondary tank circuit injects the odd order harmonic to the primary resonant tank circuit by way of the rectifier and the transformer.

9. The method of claim 7, wherein the secondary tank circuit injects the odd order harmonic to the primary resonant tank circuit by way of the inverter circuit.

* * * * *